United States Patent [19]
Sorensen

[11] 3,843,315
[45] Oct. 22, 1974

[54] CONTINUOUS PASTRY OVEN

[76] Inventor: Elmer Sorensen, 8081 Estaro Blvd., Fort Myers Beach, Fla. 33931

[22] Filed: Feb. 20, 1973

[21] Appl. No.: 334,066

[52] U.S. Cl.............................. 432/122, 432/146
[51] Int. Cl............................................... F27b 9/24
[58] Field of Search............ 432/122, 146, 147, 148

[56] References Cited
UNITED STATES PATENTS

| | | | |
|---|---|---|---|
| 784,854 | 3/1905 | Grace ................................. | 432/148 |
| 2,146,428 | 2/1939 | Hawkins et al. ................... | 432/148 |
| 3,449,548 | 6/1969 | Adamek et al. .................... | 219/216 |

*Primary Examiner*—John J. Camby
*Attorney, Agent, or Firm*—David E. Brook

[57] ABSTRACT

An improvement is disclosed for a continuous pastry oven of the type wherein pastry products pass through an oven chamber on a transport belt. This type of oven has an elongated baking chamber surrounded by heat insulating walls, and a main portion of baking heat is supplied conductively to the bottom of pastry by the transport belt.

The improvement described herein relates to a new and unique interrelationship between a heating plate, heating means and transport belt, which elements form the conductive heating system. Additionally, the heating plate and transport belt have certain necessary characteristics which provide an oven having maximized performance.

The heating plate is located at the bottom of the baking chamber and extends longitudinally for substantially the entire length of the baking chamber. It is a good heat conductor and also provides the required heat capacity to insure uniform baking of the products since it has a thickness of about one-half to three-fourth inches. Heating means are provided in direct contact with the heating plate and supply heat thereto which is sufficient to maintain the top surface of the plate at an elevated temperature in the range of 200–275°F.—a much lower temperature range than heretofore required. An endless transport belt formed from adhesive material such as TEFLON poly(tetrafluoroethylene) slidably and continuously engages the top of the heating plate as it transports pastry through the baking chamber.

10 Claims, 4 Drawing Figures

CONTINUOUS PASTRY OVEN

BACKGROUND OF THE INVENTION

1. Field of the Invention

This invention relates broadly to a pastry oven and more particularly to a continuous pastry oven of the type in which unbaked pastry products enter the baking chamber on a movable belt and exit from the chamber fully baked.

2. Description of the Prior Art

Continuous pastry ovens have been described in the patent literature. In general, however, these ovens have relied upon convective heat transfer as the primary or sole baking mechanism. See, for example, Greer, U.S. Pat. No. 1,679,717. Ovens of the Greer type necessitated transfer of heat from gas burners to the air and subsequently to the product. Since this is a generally inefficient baking technique, this type of oven usually required very high temperatures in the baking chamber, often 500°F. or more.

More recently, conductive baking ovens of the type described in Williams, U.S. Pat. No. 3,515,854, have been developed. The Williams oven utilizes conductive heating as well as controlled radiant heaters to provide a top coloration to the baked products. A chin conveyer carries the food products through the oven, and thus eliminates the advantage gained by placing the pastry directly upon the conveying belt. As is shown in the Williams reference, the pastry products are placed in conventional baking pans (See col. 2, line 10), which are costly, cumbersome to handle, and eventually turn rancid. Additionally, this oven requires much higher baking temperatures such as the 400°-500°F. described in this reference, which is believed to be due to the use of baking pans, a chain conveyer, and the fact that the conductive heat is not confined in such a manner that substantially all of it is conducted to the endless belt.

Another attempt to overcome the problems encountered with prior art ovens is described by Norris in U.S. Pat. No. 3,646,880. The Norris oven comprises an electrically heated cooking grill wherein food products are transported through multiple heated zones by endless heating belts which are heated by upper and lower heating platens. The complexity of an oven having moving, heated belts in contact with the bottom and top of pastry products simultaneously is clear.

Although a great amount of research has been devoted to the problem, there is still a need for a continuous pastry oven having a conductive heating system which results in an oven having controllability and uniformity of the baking temperatures, and flexibility in the products which can be baked therein.

SUMMARY OF THE INVENTION

In one embodiment, the oven has an elongated insulated baking chamber having a bottom inner wall defined by a relatively heavy heating plate with electrical heating means in direct contact with the bottom surface of the plate. An endless TEFLON belt slides over the plate and carries pastry to be baked through the oven. Conductive heat transfer occurs from the metal plate through the belt to the product, and thereby effects baking. Means are provided to confine the heat produced by the heating elements to the metal plate itself and to prevent convection currents of air from carrying heat into the oven. In addition, overhead heaters are provided in the chamber which are adjustable toward and from the belt to provide sufficient heat to give the baked product the desired finish colorations to insure complete baking of the upper surfaces thereof, and to bake inner portions of pastry without causing shrinkage thereof. A further optional feature is a refrigerated plate at the exit of the oven and over which the endless belt slides to rapidly cool baked products as they emerge from the oven.

It is contemplated that the oven of the present invention be employed in a retail establishment where the products are often sold immediately upon baking. To enable the customer to observe the baking as its proceeds, one side wall of the oven can be provided with transparent window means whereby the pastry or other products are observable by customers.

The continuous pastry oven described herein has many advantages over those previously known. For example, an oven is provided wherein the heated plate can be controllably maintained at precise and uniform temperatures. Further, the oven is capable of baking pastry products at much lower temperatures than heretofore possible due to the excellent heat transfer directly from the heat source to the product. The increased heating efficiency results in turn in the consumption of less power thereby providing economy. A further advantage is that the pastry products can be placed directly on the transport belt eliminating baking pans and their concomitant disadvantages. Finally, because baking is carried out efficiently at lower baking temperatures, the oven is exceptionally flexible in that small or large pastry products can be baked without changing the belt speed or baking temperature, thereby simplifying operation of the oven.

BRIEF DESCRIPTION OF THE DRAWINGS

FIG. 2A is an enlarged fragmentary vertical sectional view of the discharge and of an oven substantially along section line 2A—2A of FIG. 1; and, FIG. 3 is a further enlarged transverse vertical sectional view through the oven of the previous figures.

DESCRIPTION OF PREFERRED EMBODIMENTS OF THE INVENTION

Figure 1:
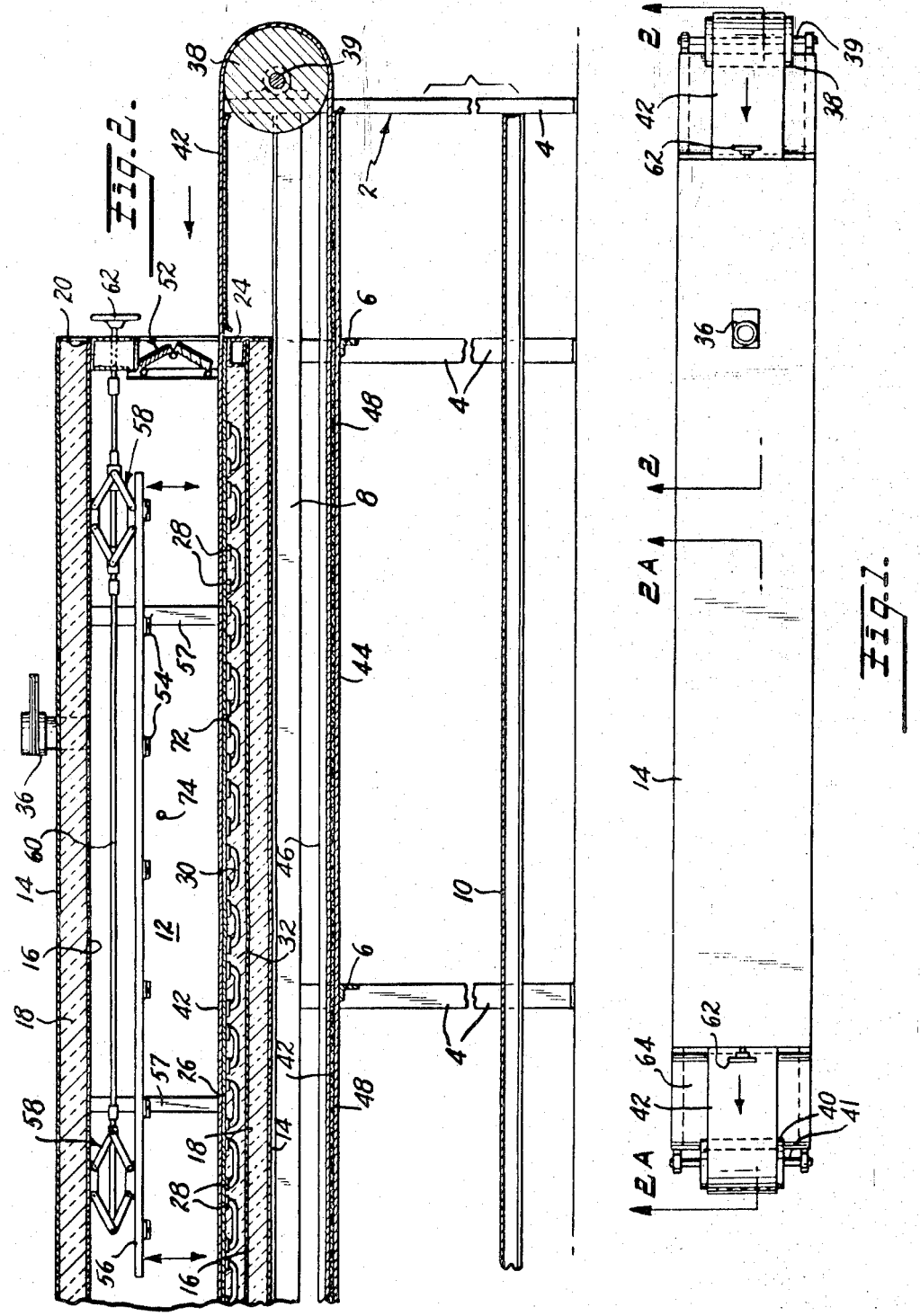
FIG. 1 is a diagrammatic plan view of an oven according to the present invention.

Referring to the drawings in more detail, it can be seen that numeral 2 designates a frame structure preferably formed of structural steel members and comprising upright leg members 4, transverse member 6, and longitudinal rail members 8. Preferably, a sheet metal pan or the like 10 is secured to and extends between the legs 4 and extends substantially the full length of the frame 2.

The longitudinal beams or frame members 8 support an oven enclosure defining a baking chamber 12, the top and sides of which are insulated against heat loss. The structure includes inner and outer metal pans 14 and 16 enclosing bodies of heat insulating material 18. Preferably the inner pans 16 are formed of heat reflecting materials such as aluminized or stainless steel to reflect heat back into compartment 12. It is also to be noted that the inner and outer pans 14 and 16 are not in direct contact with each other but have their adjacent edges define gaps, as shown at 20, whereby direct heat transfer or conduction from the inner to the outer pan is minimized or eliminated.

Figure 3:
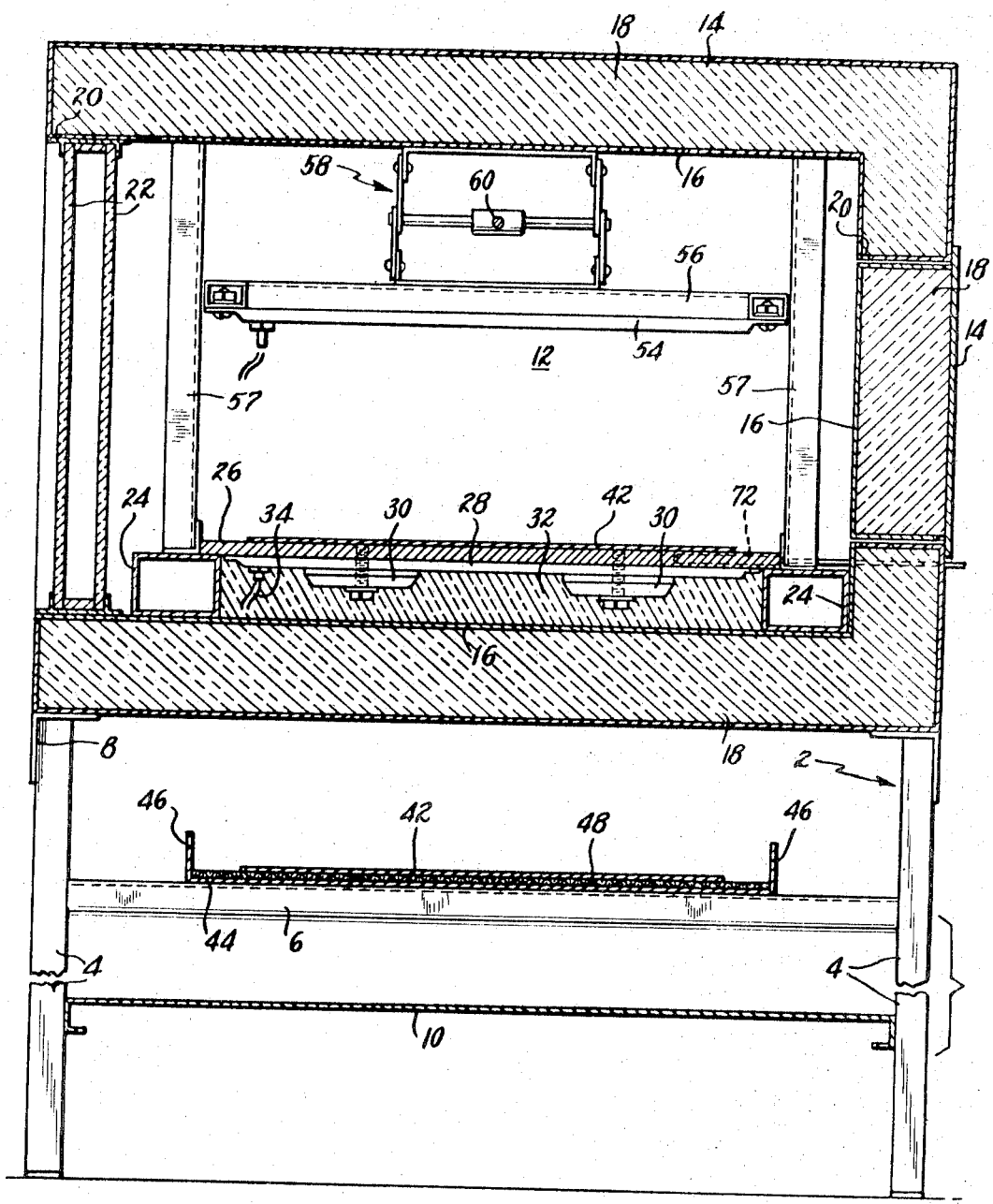

One wall of the compartment, as seen in FIG. 3, is defined by spaced panes of heat resistant glass 22 defining a sealed, dead air, heat-insulating space therebetween which keeps the outer pane quite cool. The panes 22 thus define an insulated observation port through which customers may watch the product being baked.

Within the compartment 12, a pair of box beams 24 extend longitudinally along the oven and serve to support a heating plate 26 defining the bottom surface of the baking compartment. A multiplicity of electric resistance heating elements 28 are secured by clamp means 30 to the undersurface of plate 26 in contacting relationship. Alternatively, heater elements 28 could be actually imbedded in plate 26 for adequate heat conduction therebetween. The space between the plate 26 and lower most inner pan 16 is preferably filled with heat insulating material 32 to thus eliminate any possibility of convection currents causing air heated by elements 28 to flow into the baking compartment, and to confine substantially all of the heat produced by heating elements 28 to plate 26 for conduction therethrough. Heating elements 28 are supplied with electric current through suitable conductors indicated generally at 34 in FIG. 3. If desired, the oven enclosure may be provided with a vent stack 36 (See FIG. 2) to exhaust steam and/or other fumes from the baking compartment. As stated previously, the plate 26 could be fabricated from any metal or other material having good heat conduction and heat storing characteristics. Good heat conduction is possible with metals having thermal conductivities equal to or better than those of steel (1 percent C) which is equal to 25.9 btu/(hrs.)(ft.$^2$) (°F./ft.) measured at 212°F. In order to provide the necessary heat capacity, it has been found that a steel plate should be from about one-half to about three-fourths inches thick.

Figure 2:
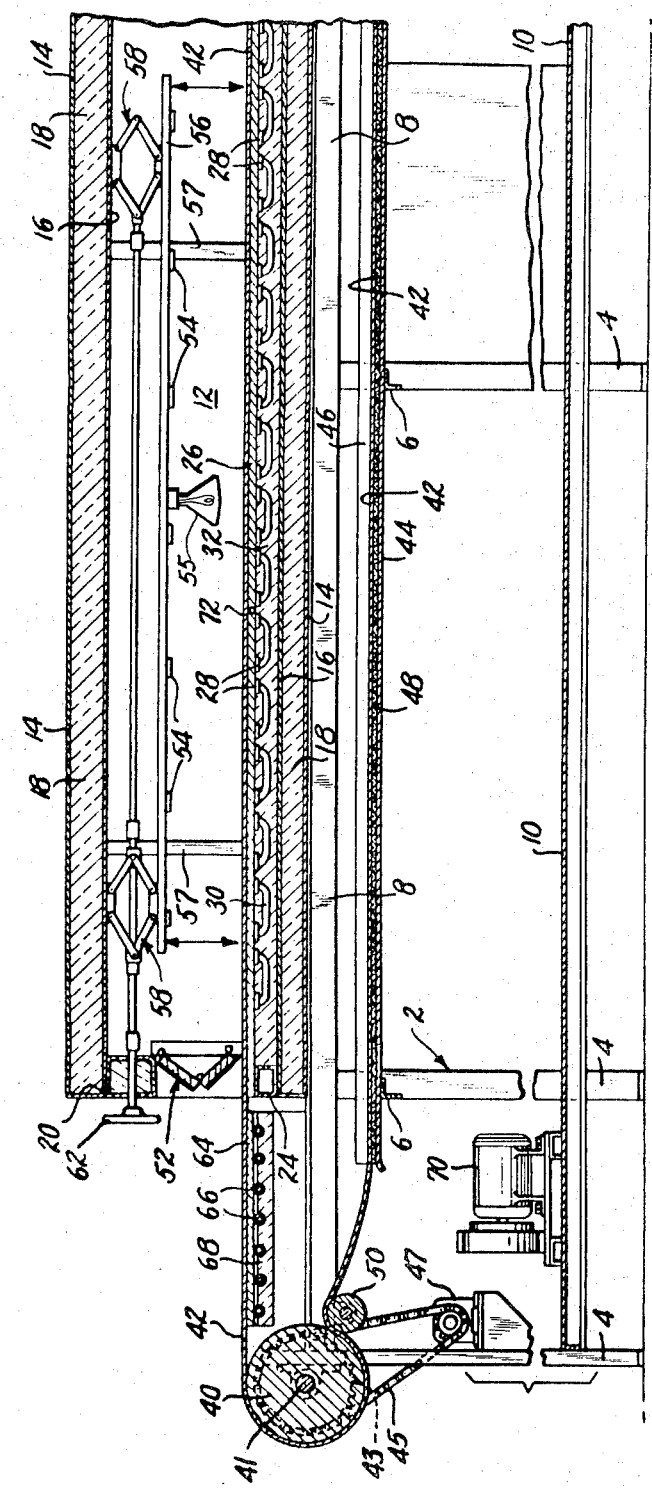
FIG. 2 is an enlarged vertical sectional view showing the entrance portion of an oven substantially along the lines 2—2 in FIG. 1.

As seen in FIGS. 2 and 2A, the frame 2 extends longitudinally beyond the ends of the baking chamber 12 and the entrance end of the frame shown in FIG. 2 has an idler drum 38 journalled thereon by means of shaft 39. The discharge end of the apparatus shown in FIG. 2A has s driving drum 40 journalled thereon, by means of shaft 41, and is provided with a drive sprocket 42 driven by roller chain 44 from a variable speed power source 46. The power source 46 may be of any conventional or suitable type but is preferably one that can be controlled to regulate the speed of rotation of the drum 40 to a desired value.

Trained over the drums 38 and 40 is an endless belt 42. Belt 42 is constructed from an adhesive or non-stick material, i.e., a material having a surface free energy below about 40 dynes/cm. Poly(tetrafluoroethylene) such as that sold under the DuPont registered trademark TEFLON is suitable. In particular, a fiber glass or cloth mat impregnated with TEFLON and having a thickness of from about 0.002–0.004 inches is ideal. Belt 42 must also be fabricated from a material which is dimensionally and thermally stable at the baking temperature and which has good heat conductance; TEFLON meets these criteria.

The upper surface of the drums 38 and 40 lie substantially in the plane containing the upper surface of the hearth plate 26 so that the upper run of the belt 42 is slidably and continuously supported by plate 26 and in good heat conducting contact therewith. The lower run of the belt 42 is slidably supported by a support pan 44 extending along the framework 2, supported by cross members 6, and extending substantially the full length of the baking enclosure and frame 2. The support pan 44 is in the form of a flat metal sheet having upstanding side flanges 46 to confine the belt 42 to a proper path of travel. it is to be noted that the upper surface of the upper run of belt 42, which supports the product being baked, is the lower surface of the lower run thereof and is the surface slidably engaging the pan 44.

A suitable cleaning means, such as an open mesh fabric 48 or the like, is laid upon the pan 44 and serves to scour or clean the outer surface of the belt 42 as the lower run thereof returns toward the driving drum 40. The returning lower run of the belt 42 is then trained over an idler roller 50 closely adjacent the roller 40 to insure sufficient frictional contact with the latter to effect forward drive of the belt. As shown, the ends of the baking compartment 12 are essentially open but they may be provided with insulated adjustable closures 52 that can be adjusted or set to provide clearance between the bottom edge thereof and the belt 42 to essentially close the ends of the baking compartment yet provide enough room below the closure for the products carried by the belt 42 to pass thereunder.

As shown in FIGS. 2 and 2A, the baking chamber 12 also contains upper heating members comprising electrically energized heating units or elements 54 and third heating means 55 supported by a suitable grid or framework 56. It is to be noted that the upper heating elements 54 are provided in two groups, separately mounted on their respective frames 56, one at the entrance end of the baking compartment and the other near the delivery end thereof. Each of the frames 56 is supported for vertical adjustment by toggle link supports 58 actuated by suitable threaded rods 60 in a well known manner. The adjustable linkage structures are of well known construction and need not be further described but it is to be noted that the rods 60 extend longitudinally through their respective ends of the housisng and are each provided with a hand wheel 62 for manual manipulation to raise and lower the frames 56 and heating elements 54. The frames 56 are guided for vertical movement and are laterally confined by upstanding members 57 which bear on the box beams 24 and further function to help support the top of the oven enclosure.

Third heating means 55 is shown positioned about two-thirds of the way through chamber 12 (See FIG. 2A). Heaters 55 may be infrared or microwave heater arrays, and their function is to bake the pastry products at the center without substantial shrinkage. As is known, infrared or microwave rays will penetrate into the center of the product as opposed to convective heating which heats the outside skin only.

In FIG. 2A, numeral 64 designates a further metal plate mounted on the frame 2 and in sliding contact with the bottom surface of the top run of belt 42 at the delivery end of the apparatus. In direct heat conducting contact with plate 64 is an expansion coil 66 of a refrigerating system. the coil 66 is encased in heat insulating material 68 and is supplied with a suitable refrigerant from a self-contained refrigeration means 70, shown only schematically in the drawings. Refrigeration equipment of the type contemplated is well known and the various connections and conduits thereof have been omitted from the drawings for clarity of illustration. Those skilled in the art, however, will readily understand how such devices may be installed.

In operation, unbaked products that have been suitably prepared for baking are placed on the endless belt 42 outwardly of the compartment 12 and the entrance end of the apparatus and are carried continuously and at uniform rate through the baking compartment. Heat produced by the heating elements 28 is conducted therefrom directly into the hearth plate 26 and maintain that hearth plate at a suitably high temperature, which may be controlled and regulated by a thermostatic element 72 (FIG. 3) housed in an opening in the plate 26. Heat contained in the hearth plate 26 is conducted directly to the endless belt 42 and from there directly into the product to be baked. At the same time the heating elements 54 and 55 carried by frames 56 are adjusted to the proper elevation so that the heat radiated therefrom onto the products produces the final color in the product and insures complete baking of the upper surfaces thereof by the time the products reach the discharge end of the apparatus. It is to be noted that the heat employed to bake the products is derived essentially and primarily from the heating plate 26 which constitutes a reservoir for heat without the necessity of heating the air in the baking compartment to the high temperatures heretofore commonly used. Thus, the products may be baked at a much lower actual temperature of heating plate 26 than was possible with air heated ovens heretofore known.

If desired, a suitable thermostat 74 (See FIG. 2) may be provided in the baking compartment 12 and arranged to control the operation of the upper heating elements 54 to maintain the heat output of the elements 54 at the desired level. If desired, each group of elements 54 may be under the control of its own thermostat.

The electrical circuitry for controlling the heater elements 28, 54 and 55 either manually or in response to the thermostatic devices 72 and/or 74 need not be described in detail since any suitable circuits, well known to those skilled in the art, may be employed.

It will be apparent that the structure shown and described results in an oven having many advantages over ovens heretofore known and achieves the objectives enumerated earlier herein. In addition, the present oven is more flexible in operation than previous ovens in that the temperature level of the baking chamber 12 and of the heating plate 26 may be changed and stabilized at the new level in a much shorter period of time than heretofore possible. It has been found that when it is necessary to change the baking temperature, for example when starting to bake a different product, the new stabilized temperature can be achieved in a matter of minutes (about 15) whereas in previous constructions it took hours. This is due in large part to the fact that the top baking heat produced by elements 54 and 55 is largely radiant, that the heat produced by elements 28 is confined substantially to the plate 26, and that the enclosure is defined by insulated walls rather than by bricks or other heat-absorbing and storing materials.

While a single specific embodiment of the invention has been shown and described herein, it is to be understood that the same is merely exemplary of the principles of the invention and that other forms or embodiments may be resorted to within the scope of the appended claims. Additionally, while the specific description relates to pastry as such, it is to be understood that the novel features are adaptable to ovens designed for the baking of products other than pastry.

What is claimed is:

1. In a continuous oven having an elongated baking chamber surrounded by heat-insulating walls and wherein a main portion of baking heat is supplied conductively to the bottom of pastry by a pastry transport belt, the improvement wherein a conductive heating system is used comprising:
   a. a heating plate located at the bottom of said baking chamber and extending longitudinally for substantially the entire length of said baking chamber, said heating plate being a good heat conductor and being from about one-half inch to about three-fourth inch thick;
   b. heating means in contact with said heating plate to supply heat to said plate sufficient to maintain the surface thereof at an elevated temperature between about 200°F. and about 275°F.; and,
   c. an endless transport belt formed from an adhesive material, the underside of said belt slidably and continuously engaging the top of said heating plate as it transports pastry through said baking chamber.

2. An improvement of claim 1 wherein said heating means in contact with said heating plate comprise electrical resistance heaters positioned at the bottom of said plate and surrounded by heat insulation except where they contact the plate.

3. An improvement of claim 2 wherein said belt is formed from poly(tetrafluoroethylene).

4. An improvement of claim 3 wherein said belt has a thickness of from about 0.002 inches to about 0.004 inches.

5. An improvement of claim 4 wherein said pastry oven includes an additional heating source located above said belt.

6. An improvement of claim 5 wherein said additional heating means comprises a microwave heating element.

7. An improvement of claim 5 wherein said additional heating means comprises an infrared heating element.

8. An improvement of claim 1 wherein said baking chamber has one wall comprising heat insulating glass.

9. An improvement of claim 5 wherein said baking chamber has one wall comprising heat insulating glass.

10. An improvement of claim 9 additionally including a cleaning means positioned to contact said transport belt after the exit from the baking chamber.

* * * * *